(12) United States Patent
Dreyer et al.

(10) Patent No.: US 11,277,963 B2
(45) Date of Patent: Mar. 22, 2022

(54) METHOD FOR REGULATING THE THROWING BEHAVIOR OF A CENTRIFUGAL SPREADER FOR FERTILIZER

(71) Applicant: Amazonen-Werke H. Dreyer SE & Co. KG, Hasbergen (DE)

(72) Inventors: Justus Dreyer, Osnabrück (DE); Florian Rahe, Lotte (DE); Thomas Wessels, Osnabrück (DE); Markus Ströbel-Fröschle, Georgemarienhütte (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 69 days.

(21) Appl. No.: 16/487,501

(22) PCT Filed: Feb. 14, 2018

(86) PCT No.: PCT/EP2018/053607
§ 371 (c)(1),
(2) Date: Aug. 21, 2019

(87) PCT Pub. No.: WO2018/153737
PCT Pub. Date: Aug. 30, 2018

(65) Prior Publication Data
US 2020/0068796 A1 Mar. 5, 2020

(30) Foreign Application Priority Data

Feb. 22, 2017 (DE) ...................... 10 2017 103 567.2

(51) Int. Cl.
*A01C 17/00* (2006.01)
*A01C 21/00* (2006.01)

(52) U.S. Cl.
CPC .......... *A01C 17/008* (2013.01); *A01C 17/001* (2013.01); *A01C 21/005* (2013.01)

(58) Field of Classification Search
CPC .... A01C 17/008; A01C 17/001; A01C 21/005
(Continued)

(56) References Cited

U.S. PATENT DOCUMENTS 3,160,964 A * 12/1964 Boyer ....................... E01H 5/06
37/241
3,519,169 A * 7/1970 Holland ................ E01C 19/202
222/626

(Continued)

FOREIGN PATENT DOCUMENTS

DE        19723359 A1    12/1998
DE  10 2013 103060 A1    10/2014
(Continued)

OTHER PUBLICATIONS

International Search Report issued in International Application No. PCT/EP2018/053607 dated May 17, 2018.
(Continued)

*Primary Examiner* — Chee-Chong Lee
(74) *Attorney, Agent, or Firm* — Mintz Levin Cohn Ferris Glovsky and Popeo, P.C.; Steven M. Jensen

(57) ABSTRACT

The invention relates to a method for regulating the throwing behavior of a centrifugal spreader for fertilizer and to a centrifugal spreader configured therefor. According thereto, a target throwing distance is determined for a target working width. Furthermore, one of several rotational speed levels is selected for at least one spreading disc to approximate the actual throwing distance to the target throwing distance. Finally, an adapted target throwing angle for regulating an actual throwing angle is determined from the actual throwing distance (WW1) and counteracts in a compensatory (Continued)

manner a deviation from the target working width caused be the difference between the actual throwing distance and the target throwing distance. Continuous regulation of the throwing distance then becomes unnecessary, resulting in more stable regulation of the overall throwing behavior.

13 Claims, 4 Drawing Sheets

(58) Field of Classification Search
USPC .............................................. 239/7
See application file for complete search history.

(56) References Cited

U.S. PATENT DOCUMENTS

| | | | | |
|---|---|---|---|---|
| 3,995,569 A * | 12/1976 | Picardat | ................. | A01C 17/00 111/12 |
| 4,442,979 A * | 4/1984 | Kupper | ................. | E01C 19/203 239/656 |
| 4,491,275 A * | 1/1985 | Holsworth | ............. | A01C 17/00 222/505 |
| 4,588,127 A * | 5/1986 | Ehrat | ................. | A01M 7/0092 239/156 |
| 2014/0263713 A1* | 9/2014 | Stocklin | ............... | A01C 17/008 239/11 |

FOREIGN PATENT DOCUMENTS

| | | |
|---|---|---|
| DE | 10 2014 116023 A1 | 5/2016 |
| DE | 10 2015 116948 A1 | 4/2017 |

OTHER PUBLICATIONS

International Preliminary Report on Patentability dated Aug. 27, 2019 in corresponding PCT Application No. PCT/EP2018/053607.

* cited by examiner

METHOD FOR REGULATING THE THROWING BEHAVIOR OF A CENTRIFUGAL SPREADER FOR FERTILIZER

The invention relates to a method for regulating the throwing behavior of a centrifugal spreader for fertilizer and to a correspondingly configured centrifugal spreader.

As is known, for example from DE 197 23 359 A1, centrifugal spreaders, in particular those with two juxtaposed and counter-rotating spreading discs, are suitable for the distribution of fertilizer on agricultural areas under crop. The fertilizer is distributed in continuous runs over a predetermined working width in dependence of the type of spreading disc and the type of fertilizer in the form of a characteristic spread fan or spread pattern.

The average throwing distance WW and the average throwing angle AWW in the fertilizer distribution are suitable parameters for characterizing spread patterns of a spreading disc. These values are provided in spreading tables for different working widths AB and for different types of fertilizer and can be entered for a desired working width at an operating station at the beginning of the work operation. The average throwing angles AWW and throwing distances WW are determined, for example, as a 50% percentile of a throwing angle distribution measured in the circumferential direction relative to the center of the spreading disc or a throwing distance distribution of the spread pattern defined radially from the spreading disc, respectively. Other common parameters are the initial value AWWa for the throwing angle distribution as a 5% percentile and the associated final value AWWe as a 95% percentile, as well as an initial value WWa for the throwing distance distribution as a 5% percentile and a final value WWe as a 95% percentile. In addition, relationships between the working width AB, the average throwing distance WW and the average throwing angle AWW are known, so that the latter can be calculated from the working width AB and the average throwing distance WW and vice versa. In the following, the terms "actual" and "target" are used synonymously with the terms "actual value of" and "target value for" for linguistic simplification.

These characteristic parameters of spread patterns are determined, for example, under reproducible conditions by bowl trials in spreading halls for individual types of fertilizer in dependence of the type of spreading disc, the rotational speed, and different positions of a fertilizer feed system formed at the spreading disc. The delivery points for the fertilizer and rotational speeds to be set for certain working widths and types of fertilizer under standard conditions are then typically specified in spreading tables.

The disadvantage, however, is that in particular the surface properties of fertilizer change depending on storage conditions, such as the humidity or the like. In particular, the friction behavior of the fertilizer grains has a decisive effect on the throwing angle distribution. Individual fertilizer batches can also differ, for example, in terms of grain size, which has a direct influence on the throwing distance distribution obtained. Therefore, the application of the spreading parameters determined under standardized conditions can lead to unsatisfactory results in a specific case of application.

Therefore, efforts have already been made to control spread fans or actual spread patterns during the fertilizer distribution and to possibly match them to a target spread pattern. In this regard, it is known, for example from DE 10 2013 103 060 A1, to distribute radar sensors on each spreading disc covering their usable throwing angle range, to emit radar lobes, and to deliver information in the usable throwing angle range about an actual throwing angle distribution and/or an actual speed distribution of the fertilizer grains thrown. From this, for example, the average throwing angle AWW can be derived. The average throwing distance WW can additionally be determined by way of radar sensors using the method known from DE 10 2014 116 023 A1. Continuous information about the actual throwing angle and the actual throwing distance is therefore available during operation, where such information can be used to control the feed systems for fertilizer associated with the spreading discs and/or to adjust the rotational speed of the spreading discs.

In principle, in particular the rotational speed and the throwing angle for a known type of spreading disc can in principle be adjusted on this basis in such a way that the fertilizer spreader operates optimally for a given working width. For this purpose, a control loop for setting the throwing distance and other a further control loop for setting the throwing angle preferably operate in parallel, where these control loops can influence each other.

With the combination of monitoring the throwing angle and the throwing distance during the fertilizer distribution, the throwing angle distribution of the spread pattern can then be continuously adapted to a predetermined working width and the type of fertilizer used, without needing to resort to spreading tables.

However, practice has shown that the control loop for setting the throwing distance is too slow under certain conditions of use and barely predictable dead times arise, so that stable regulation of the throwing behavior overall and in particular maintaining the predetermined working width is not possible in a reliable manner.

There is therefore a need to further develop the regulation of the throwing behavior during fertilizer distribution in such a way that the throwing behavior remains more reliable within its targets and, in particular, predetermined working widths are obtained.

The object posed is satisfied according to claim 1 with a method for regulating the throwing behavior of a centrifugal spreader for fertilizer. According thereto, a target value for the throwing distance is first determined matching a target value for the working width. Then, one of several rotational speed levels is adjusted for at least one spreading disc in order to approximate the actual value of the throwing distance to the target value for the throwing distance. An adapted target throwing angle for regulating an actual throwing angle is determined from the actual throwing distance on this basis and counteracts in a compensatory manner the deviation from the target working width (due to the rotational incrementation) caused be the difference between the actual throwing distance and the target throwing distance.

With the angular offset, the originally specified target value for the throwing angle is converted into an adjusted target value for the throwing angle for continuously regulating.

An suitable number of rotational speeds is predetermined for operator selection. Matching the target value for the working width, the throwing distance is set by selecting a rotational speed level so that the throwing distance thus set is as close as possible to the target value for the throwing distance and can then be kept as constant as possible.

The throwing behavior is therefore adjusted primarily by readjusting the throwing angle to the specifications and in particular to the working width specified. The readjustment of the throwing distance, which is more critical in terms of regulating behavior, by adjusting the rotational speed, on the other hand, is of secondary nature and can either be dispensed with entirely or limited, for example, to certain critical conditions, such as unwanted change in the spread profile and/or an adjustment limit of the associated feed system being reached.

As a result, regulating the throwing behavior is stabilized overall. The predetermined working width can therefore be maintained more reliably under different working conditions. In particular, undershooting the target throwing distance, which is acceptable due to the rotational speed incrementation, can be continuously compensated by increasing the throwing angle in that the spread pattern is widened to a more trapezoidal distribution and the actual value of the working width is thereby adapted to the target working width.

The term regulating the throwing behavior is to be understood such that control variables are processed in electronic controllers taking into account predetermined control system behavior and adjustment values are calculated from this and output, for example. for actuating an actuator in the feed system of the respective spreading disc. For example, the control variable for regulating the throwing angle, including an offset for the target throwing angle and subsequently calculating the difference is calculated with the actual throwing angle last measured.

The target throwing angle can be predetermined in an absolute manner or can be calculated by way of suitable algorithms from the current throwing distance, i.e. the actual throwing distance measured, and the desired working width. The actual throwing angle is readjusted by adjusting the fertilizer delivery point of the respective feed system A predetermined target throwing angle is preferably adjusted by an angular offset in order to determine the adjusted target throwing angle. In this way, a target throwing angle determined from spreading trials can be adjusted as simply and effectively as possible to the deviation of the actual throwing distance from the target throwing distance caused by the rotational speed incrementation, so that the desired working width can ultimately be set.

Adjacent rotational speed levels preferably differ from each other by at least 10% of the maximum rotational speed of the centrifugal wheel. This enables practical operation of the centrifugal spreader and a particularly stable regulating behavior.

The actual throwing distance during fertilizer distribution is preferably continuously measured, in particular by way of radar beams from the centrifugal spreader, and is then further compared to the target throwing distance. The actual throwing distance measured can then be made available continuously to the control loop as an input variable for setting the throwing angle. Furthermore, it can be verified whether the actual throwing distance reaches critical thresholds in order to possibly trigger a change of the rotational speed level set.

Radar measurement, insensitive to interferences, enables reliable measurement of moving objects, such as the fertilizer grains. Continuous measurement is understood to mean that the measurement of the actual throwing angle and the actual throwing distance is repeated at suitable time intervals during fertilizer distribution.

The actual throwing angle during fertilizer distribution is preferably continuously measured, in particular by way of radar beams from the centrifugal spreader, and is then compared to the target throwing angle. As a result, the throwing behavior can be continuously adapted to specifications in order to maintain the target working width.

The actual throwing angle is preferably a characteristic, in particular average, throwing angle of a throwing angle distribution measured by way of radar beams. The average throwing angle allows for fast calculation of the direction of the fertilizer distribution, based on known parameters of spread images. A measured throwing angle distribution provides the basis for different algorithms for assessing the throwing direction and reliably determining the average throwing angle.

Regulating preferably readjusts the actual throwing angle at intervals of at least 5 s when the fertilizer is distributed. This promotes stable control behavior that is sufficiently accurate for normal working operation.

The actual throwing angle is preferably continuously adjusted on the basis of the adjusted target throwing angle, and the rotational speed level is not or only changed during this time, if a predetermined threshold criterion is met. The threshold criterion can be verified continuously, but naturally does not require continuous adjustment of the throwing distance by changing the rotational speed. The threshold criterion is determined in advance so that it can only be fulfilled in exceptional cases. Regulating can then be simplified and, if necessary, nevertheless be adapted to changing working conditions or for compensation of unexpected fluctuations in the throwing behavior.

The threshold criterion is preferably met if a throwing distance assigned to an adjacent rotational speed level is closer to the target throwing distance than the actual throwing distance last measured, and/or if the actual throwing angle parts from an allowable angle range, in particular a range of 18° to 25°.

The target throwing distance is preferably calculated from a target throwing angle predetermined in an absolute manner of, in particular, 18 to 20° and the target working width. Throwing angles of 18 to 20° allow for particularly favorable triangular spread profiles for subsequent runs. Due to the configuration, the actual throwing angles are then as much as possible slightly thereabove, but not therebelow if possible.

The target throwing distance is therefore first adapted to a particularly favorable throwing angle and the desired working width. Based on this, a subsequent compensatory offset of the target throwing angle and respective regulation of the actual throwing angle in the sense of a moderate deterioration of the spread pattern can be easily acceptable.

The target throwing distance can alternatively, also by way of a predetermined constant, depend on the target working width. In principle, for example, a factor of 0.60 to 0.65 (for example, target throwing distance=0.62*working width) has stood the test.

The target throwing distance and the target throwing angle for the target working width are preferably determined on the basis of spreading trials with the fertilizer. Such measurements of spread patterns can be taken under standardized conditions in a hall and with a plurality of spreading parameters with all commercially available fertilizers.

The angular offset is set on the basis of a dependence of the actual throwing distance, determined in spreading trials for various target throwing angles for the fertilizer, from the rotational speed of the centrifugal wheel. For example, throwing distances and/or throwing angles can be determined for a plurality of possible rotational speeds and positions of the feed systems.

Thereafter, the deviations from the target throwing distance, inevitably caused by the rotational speed incrementation during the distribution of the fertilizer, can be derived by interpolation from the comparatively finer graded spreading trials. An angular offset for the target throwing angle can be determined for each rotational speed level in order to compensate for the deviations from the target throwing distance in regulating the throwing angle caused by the rotational speed incrementation.

For initializing regulating, a calibration run of 10 to 20 s duration, in particular 14 to 16 s duration, under specification of the target working width, is performed with the spreading disc to be used and with the type of fertilizer to be distributed. This is done, for example, after the wheel assembly has been replaced and/or after the working width has changed and/or after a new fertilizer batch has been filled and enables proper distribution of that type of fertilizer immediately after the calibration run.

The calibration run is preferably conducted only if the value 0 has been registered at least once for the rotational speed of the spreading disc following a preceding calibration run, and if at least one spreading disc is in the spreading mode for normal subsequent runs. The calibration run is then preferably triggered automatically. The value 0 indicates that the spreading discs have stopped, for example, for refilling fertilizer. A calibration run, which can then be triggered unnecessarily after a change to another field, is of minor importance as an exceptional case.

According to claim 13, the object posed is further satisfied with a centrifugal spreader for fertilizer comprising two spreading discs for spreading the fertilizer over the predetermined working width and a regulation for performing the method according to at least one of the preceding claims.

The centrifugal spreader preferably further comprises a mechanical drive for the spreading discs and an input unit for adjusting the rotational speed level by selecting from several predetermined rotational speed levels. In a mechanical centrifugal spreader, the rotational speed of the spreading discs is specified by the centrifugal spreader by way of a mechanical drive. For this purpose, the operator is shown the rotational speed set. Furthermore, several rotational speed levels are available for operator selection.

With a mechanically driven spreading disc, it is particularly advantageous to adjust the rotational speed only stepwise by transmitting a control signal from the centrifugal spreader to a tractor that is coupled thereto and drives the spreading disc. For example, the centrifugal spreader can transmit information and commands to the tractor via an isobus or the like in order to set a required rotational speed of the power take-off shaft and to thereby to activate a specific rotational speed level for the spreading discs. In principle, such adjustments can also be effected in an automated manner without the intervention of the operator.

The centrifugal spreader comprises in particular radar-based monitoring devices for continuously measuring the actual throwing angle and the actual throwing distance.

A warning message is preferably issued if the actual throwing distance is outside an allowable target value range and/or an adjustment limit for the associated feed system has been reached, and if and the rotational speed level has to be changed Warnings are particularly advantageous with a mechanical drive for the centrifugal spreader by way of a power take-off shaft or the like, since the rotational speed then usually cannot be changed by the centrifugal spreader but only by operator intervention at the tractor. For example, a necessary rotational speed adjustment is displayed at the tractor and acknowledged or edited by the operator.

Preferred embodiments of the invention are shown in the drawings, where

Figure 1:
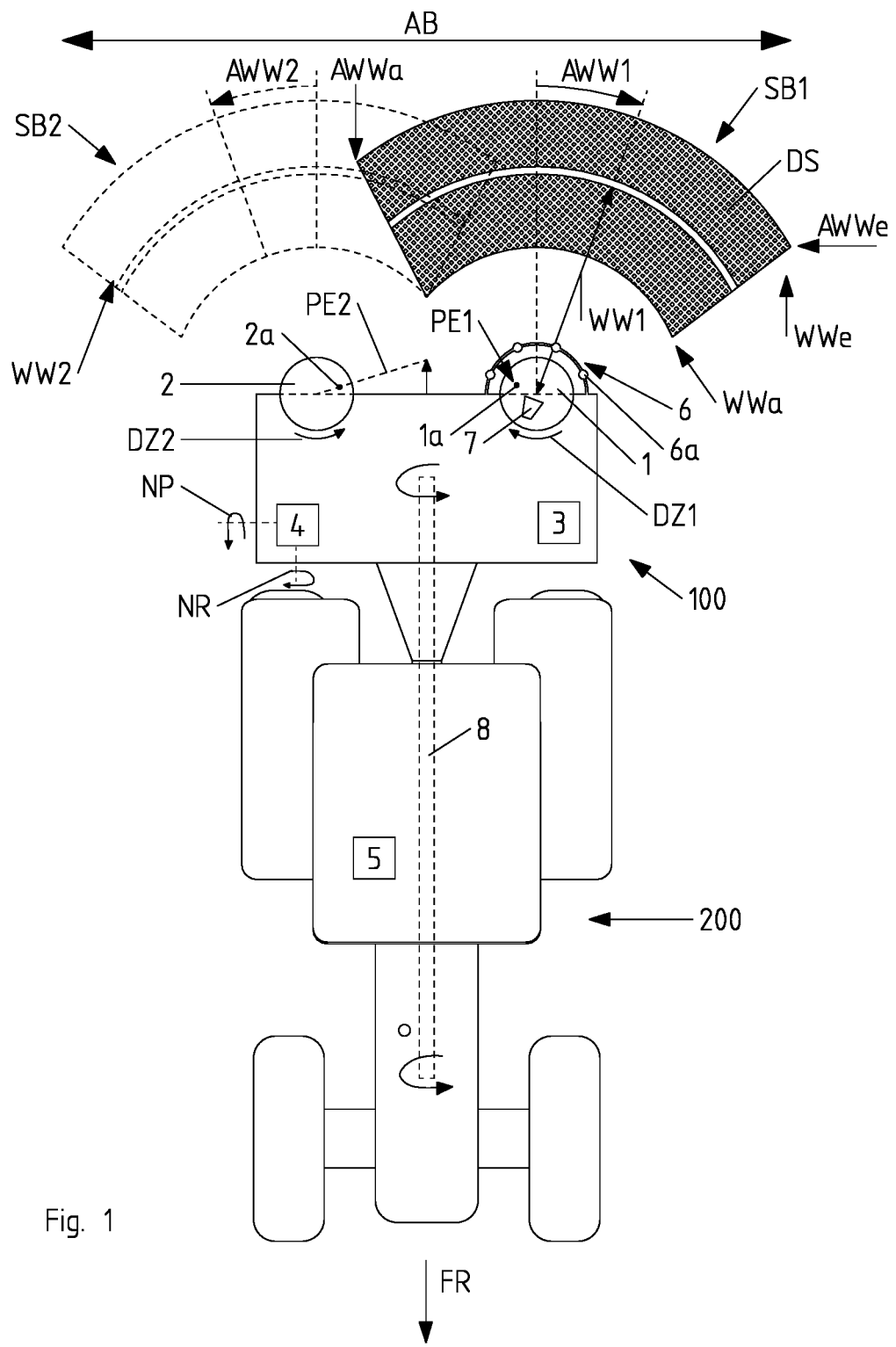
FIG. 1 shows a schematic top view onto a centrifugal spreader with a spread pattern generated by the latter and characteristic parameters.

As can be seen from FIG. 1, centrifugal spreader 100 in a preferred embodiment comprises a first spreading disc 1 with an associated fertilizer feed system 1a and a second spreading disc 2 with an associated feed system 2a. Feed systems 1a, 2a comprise conventional metering devices, where at least positions PE1, PE2 of their delivery points can be adjusted by machine relative to spreading discs 1, 2. Positions PE1, PE2 are defined, for example, as a position angle relative to any auxiliary line in the direction of rotation of respective spreading disc 1, 2, possibly further as a radial distance from the axis of rotation of respective spreading disc 1.2.

FIG. 1 shows feed systems 1a, 2a schematically by way of their delivery points for fertilizer. For reasons of clarity, only position PE2 of second feed system 2a is indicated by way of example by its position angle. The same relationship with respect to the direction of rotation of first spreading disc 1 applies for feed system 1a.

Centrifugal spreader 100 further comprises a control unit 3 for controlling spreading discs 1, 2 and their feed systems 1a, 2a. Control unit 3 enables at least an adjustment of positions PE1, PE2 and, in particular with mechanically driven spreading discs 1, 2 also the stepwise adjustment of their rotational speeds DZ1, DZ2 to corresponding rotational speed levels DZS (see FIG. 2). With mechanically driven spreading discs 1, 2, the rotational speed levels DZS are selected, for example, in the region of a tractor 200.

Schematically illustrated is also an optional inclination measuring device 4 for measuring a first slope angle NP in direction of travel FR and a second slope angle NR orthogonal to direction of travel FR.

Control unit 3 with operating station 5, which is shown only by way of example in the region of a tractor 200 connected to centrifugal spreader 100, forms a control system for centrifugal spreader 100. Operating station 5 can also be arranged at centrifugal spreader 100. Operating station 5 serves to display machine parameters of centrifugal spreader 100 and to input at least one type of fertilizer DS used, a working width AB to be set for the fertilizer distribution and for selecting a rotational speed level DZS for rotational speeds DZ1, DZ2.

In the usable throwing angle range of first spreading disc 1, a monitoring device 6 for measuring a throwing angle distribution is formed essentially transverse to direction of travel FR. Monitoring device 6. comprises several radar sensors 6a arranged annularly around spreading disc 1. They emit, for example, radar lobes and detect the radar beams reflected by the fertilizer particles in a known manner to calculate from this an actual value of throwing angle AWW1. In principle, other methods that monitor the thrown fertilizer particles, for example, optical or electromechanical ones, would also be conceivable for this purpose.

In addition, a monitoring device 7 for measuring a throwing distance distribution of the fertilizer distribution is schematically indicated in the region of first spreading disc 1. Monitoring device 7 as well emits at least one radar lobe and detects the radar beams reflected by the fertilizer particles in a known manner to calculate from this an actual value of throwing distance WW1. Here as well, other methods which monitor the thrown fertilizer particles, for example, optical or electromechanical one, would also be conceivable.

Spreading discs 1, 2 are rotated in opposite directions by tractor 200 by way of a drive coupling 8 at preferably identical rotational speeds DZ1, DZ2. Drive coupling 8 is a mechanical one by way of the power take-off shaft indicated, but can also be hydraulic or the like.

Spreading discs 1, 2 are arranged axially symmetrically relative to direction of travel FR and preferably produce symmetrical spread patterns SB1, SB2 on a horizontal reference plane. This is indicated schematically in FIG. 1 merely to clarify the characteristic parameters. However, spread patterns SB1, SB2 can also be formed asymmetrically depending on the specification and/or the given topography. For appropriate adjustments of the actual values of throwing angles AWW1, AWW2 to their target values, feed systems 1a, 2a can therefore be set independently of one another.

Figure 2:
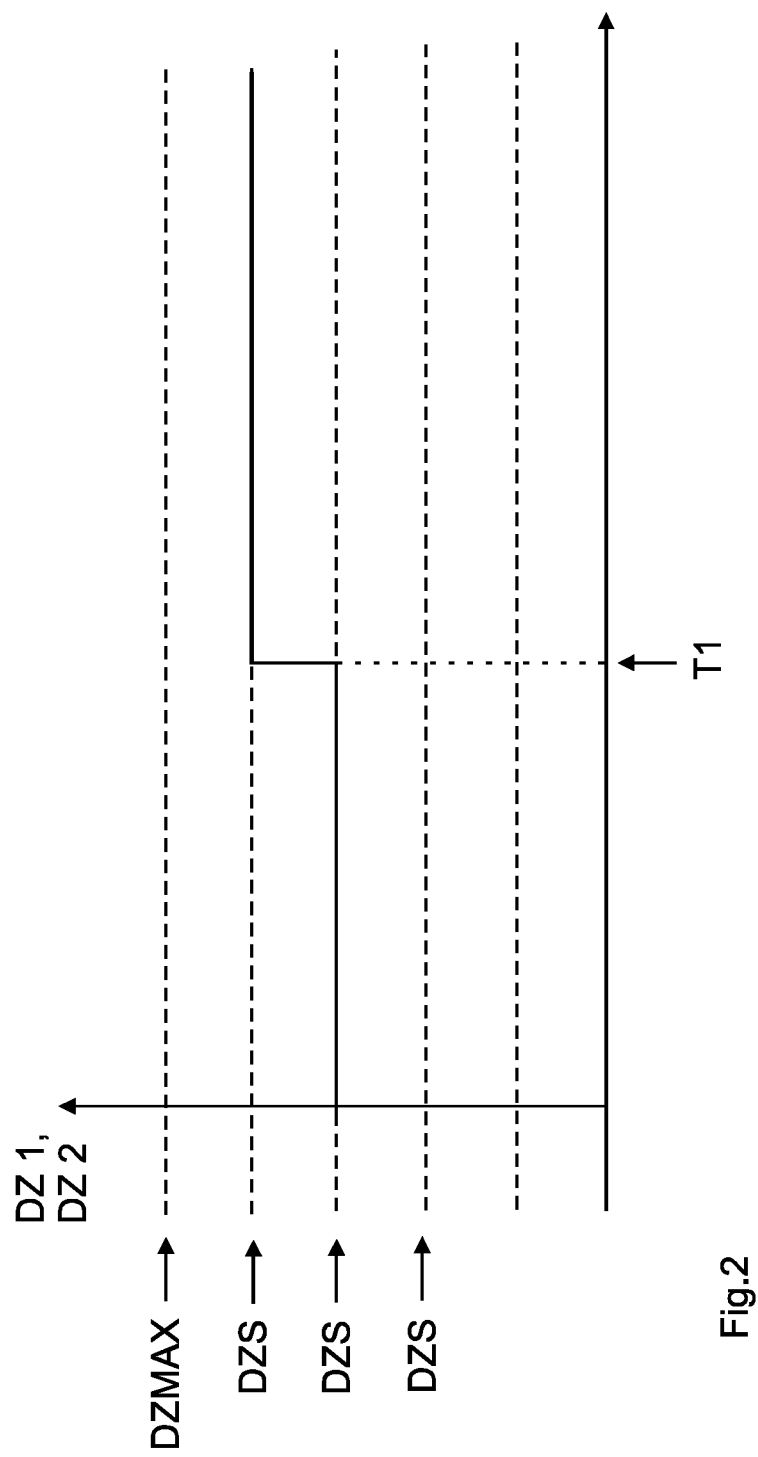
FIG. 2 shows a schematic diagram with rotational speed levels.

On the basis of a speed-time diagram, FIG. 2 illustrates that rotational speeds DZ1, DZ2 during operation can each be set to only one of several selectable rotational speed levels DZS. According thereto, the range of possible rotational speeds DZ1, DZ2 is divided into rotational speed levels DZS up to the maximum rotational speed DZMAX of spreading discs 2, where their spacing is predetermined in a suitable manner, and of which one is selected to drive spreading discs 1, 2.

FIG. 2 shows an example of a change to the next higher rotational speed level DZS at the point in time T1. Rotational speed levels DZS can differ from each other, for example, by at least 10% of the maximum rotational speed DZMAX. Also conceivable would be increments defined in an absolutely manner of, for example, at least 100 rpm or at least 200 rpm.

The respectively selected rotational speed level DZS is preferably maintained unchanged during the distribution of the fertilizer. Depending on the embodiment, an adjacent rotational speed level DZS is changed to during operation only under certain conditions, for example, with an impermissible deviation of actual throwing distance WW1 from target throwing distance WWs1 or when reaching an adjustment limit for feed systems 1a, 2a.

Figure 3:
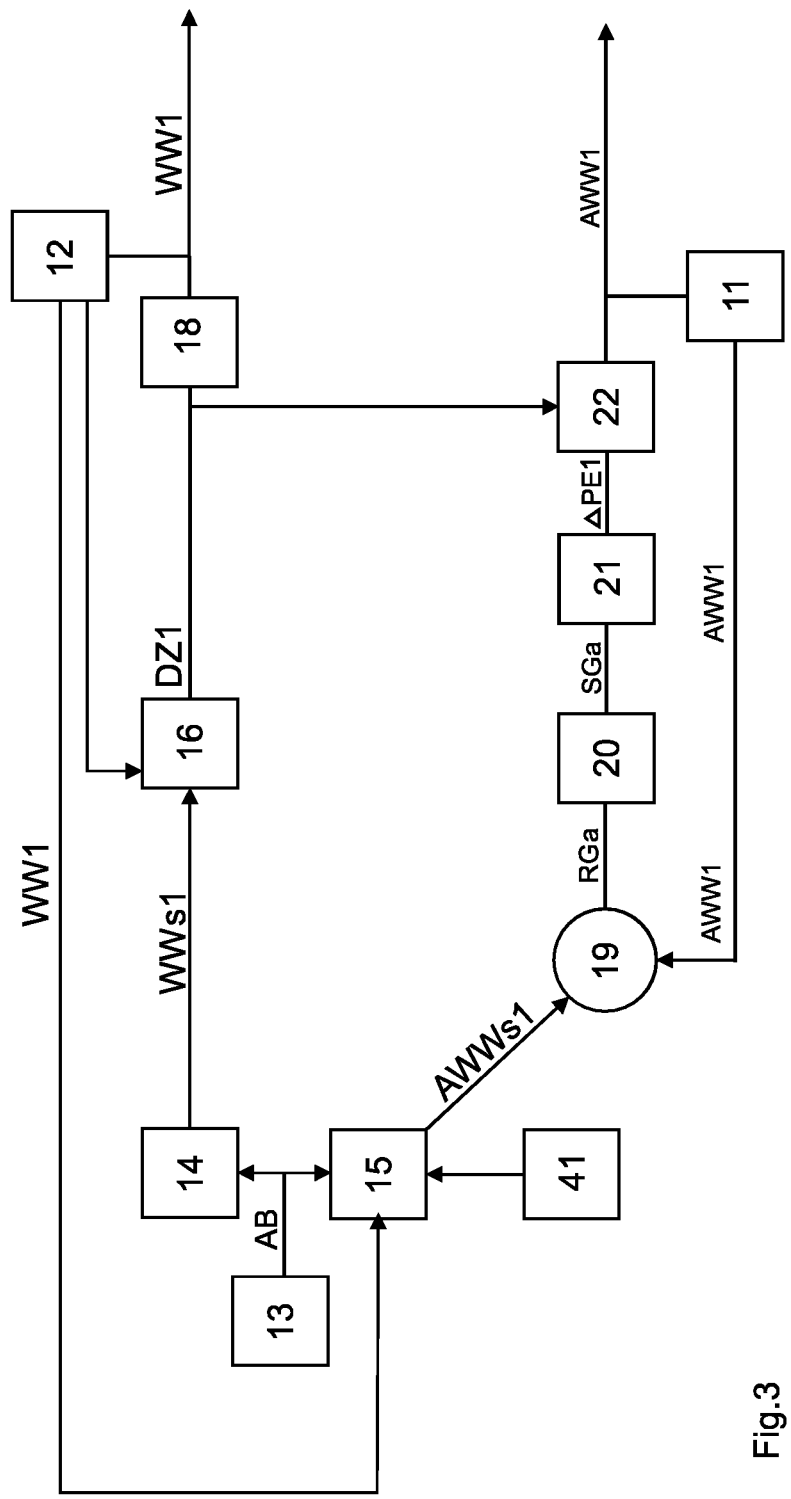
FIG. 3 shows a preferred embodiment of the method.

As can be seen in FIG. 3 with respect to the method, regulating the throwing behavior in a first preferred embodiment of the invention is effected by continuously regulating the actual throwing angle AWW1 and at constant rotational speed DZ1 and therefore while maintaining associated rotational speed level DZS.

Only the regulation on first spreading disc 1 shall be described hereafter as a representation of both. Second spreading disc 2 can be regulated in the same way on the basis of the data measured at and the calculation results obtained for first spreading disc 1 or in a corresponding manner by way of corresponding monitoring devices at second spreading disc 2.

In detail, regulating according to FIG. 3 is based on a step 11 for continuously measuring actual throwing angle AWW1 of the distribution of fertilizer using monitoring device 6, on a step 12 for continuously measuring actual throwing distance WW1 of the distribution of fertilizer using monitoring device 7, and on a step 13 for specifying a target value for working width AB by the operator.

In a step 14, a target throwing distance WWs1 is calculated from target working width AB. For example, an empirically determined conversion factor of 0.60 to 0.65 is suitable for this purpose. Target throwing distance WWs1 results, for example, from: WWs1=0.62*AB.

In a step 15, an adjusted target throwing angle AWWs1 for the throwing angle regulation is calculated in step 19 from the predetermined target working width AB specified in step 13 and, matching the actual throwing distance WW1 determined in step 12, and preferably continuously updated. Depending on the desired spread profile, these values can be matched to one another on the basis of empirically obtained data and/or based on theoretical considerations.

In a step 16, a rotational speed DZ1 as well suited as possible to the target throwing distance WWs1 calculated in step 14 is set in step 16. This rotational speed is set by specifying a target throwing distance WWs1 in step 14 and taking into account within a control loop the actual throwing distance measured in step 12 and depending on the particular fertilizer used. The rotational speed can be set only in discrete steps and the rotational speed is adjusted in step 16 such that a rotational speed level DZ1 is set which leads to an actual throwing distance WW1 that comes closest to desired throwing distance WWs1 or is preferably just therebelow. It is also conceivable that for the initial setting of the spreader at the beginning of work or when changing the target value specification for the throwing distance, an empirically determined and stored rotational speed level is first set to closest to the desired throwing distance in a first step. Rotational speed level DZS with an actual throwing distance WW1 disposed as close below target throwing distance WWs1 as possible is particularly suitable for compensatory enlargement of target throwing angle AWWs1 based on triangular spread profiles, see below.

In a step 19, a control variable RGa for the throwing angle regulation is calculated, for example, by subtraction, from the target throwing angle AAWs0 and the actual throwing angle AWW1 measured.

Taking into account a known control system behavior 21 of feed system 1a, a controller in a step 20 determines a control variable SGa for the throwing angle regulation for feed system 1a of first spreading disc 1, for example, in the form of a change ΔPE1 for position PE1.

In a step 22, position PE1 is changed in accordance with rotational speed DZ1, whereby actual throwing angle AWW1 is readjusted.

By re-executing step 11, i.e., measuring readjusted actual throwing angle AWW1, the control loop of the throwing angle regulation is closed and can be passed through again for the continuous monitoring of spread pattern SB1.

In a step 18, rotational speed DZ1 causes an actual throwing distance WW1 which is measured continuously in step 12.

As can also be seen from FIG. 4 with regard to the method, regulating the throwing behavior in a second preferred embodiment differs from the regulation according to FIG. 3 by the steps described below.

According thereto, target working width AB, target throwing distance WWs1, and predetermined target throwing angle AWWs0 are determined by the operator in steps 23, 24, 25 on the basis of measured data from standardized spreading trials 31. In this case, it is advantageous to first optimize predetermined target throwing angle AWWs0 in favor of a triangular-shaped spread profile for subsequent runs, for example, to values of 18 to 20°, and to adapt target throwing distance WWs1 for desired working width AB thereto.

Spreading trials 31 are performed at different rotational speeds DZ1 at a rotational speed incrementation, which is finer than the incrementation of the selectable rotational speed levels DZS. By interpolation of the throwing distances thus measured in spreading trial 31, the individual rotational speed levels DZS can then each be assigned a throwing distance in a simple and precise manner, for example, to pre-set a suitable DZS at the beginning of the work. The actual setting of the DZS during the work then takes place in a regulated manner by way of determining throwing distance WW1 in step 12.

Step 26 substantially corresponds to step 16. Here as well, it is provided that a change of rotational speed level DZS and thereby of rotational speed DZ1 is allowed during the fertilizer distribution, provided a criterion predetermined for this is met. This can be, for example, a deviation of measured actual throwing distance WW1 from target throwing distance WWs1 beyond a certain degree. This would also be conceivable at the end of a reasonable adjustment range for feed system 1a.

By changing rotational speed level DZS, it is possible to prevent a compensatory angular offset ΔAWW to be calculated in step 17 from parting from a practicable and/or advantageous working range. This would be the case, for example, if the spread profile would assume an undesirable trapezoidal shape without rotational speed level DZS changing.

However, a change in rotational speed level DZS is subordinate and/or is not carried out continuously, in contrast to the continuous readjustment of actual throwing angle AWW1.

A necessary change of rotational speed level DZS can be indicated by an alarm, in particular, when spreading discs 2 are driven mechanically. The change of rotational speed DZ1 can then be initiated by the operator by activating an adjacent rotational speed level DZS. In step 17, a compensatory angular offset ΔAWW is determined for respectively determined actual throwing distance WW1 and desired throwing distance WWs1. A target value AB for the working width from step 23 determined by way of spreading trials can be used for this purpose and in addition to the target throwing distance or alternatively.

Corresponding to step 15, step 28 outputs a target throwing angle AWWs1, where a compensatory angular offset ΔAWW is there possibly taken into account instead of actual throwing distance WW1. In other words, in the embodiment according to FIG. 4, a target throwing angle AWWs0 determined by way of spreading trials is specified and it is possibly adapted to current actual throwing distance WW1 by a compensatory angular offset ΔAWW specified in step 17. In addition, FIGS. 3 and 4 indicate a step 41 for conducting an initial calibration run which has a duration, for example, of 15 seconds and is used to initialize the regulation with spreading disc 2 used and the type of fertilizer DS used. Thereafter, the regular work operation can be started. Regulating behavior that is correct and stable from the outset can thus be obtained.

With mechanically driven spreading discs 2, rotational speed DZ1 is set in that the operator is displayed suitable rotational speed levels DZS and, in particular, the most suitable rotational speed level DZS is proposed. Basically, this procedure is also conceivable for other drive systems for spreading discs 2.

The control loop system behavior for changing actual throwing distance WW1 in dependence of rotational speed DZ1 and actual throwing angle AWW1 in dependence of position PE1 of feed system 1a is respectively known in principle and therefore not explained in detail in this context.

Figure 4:
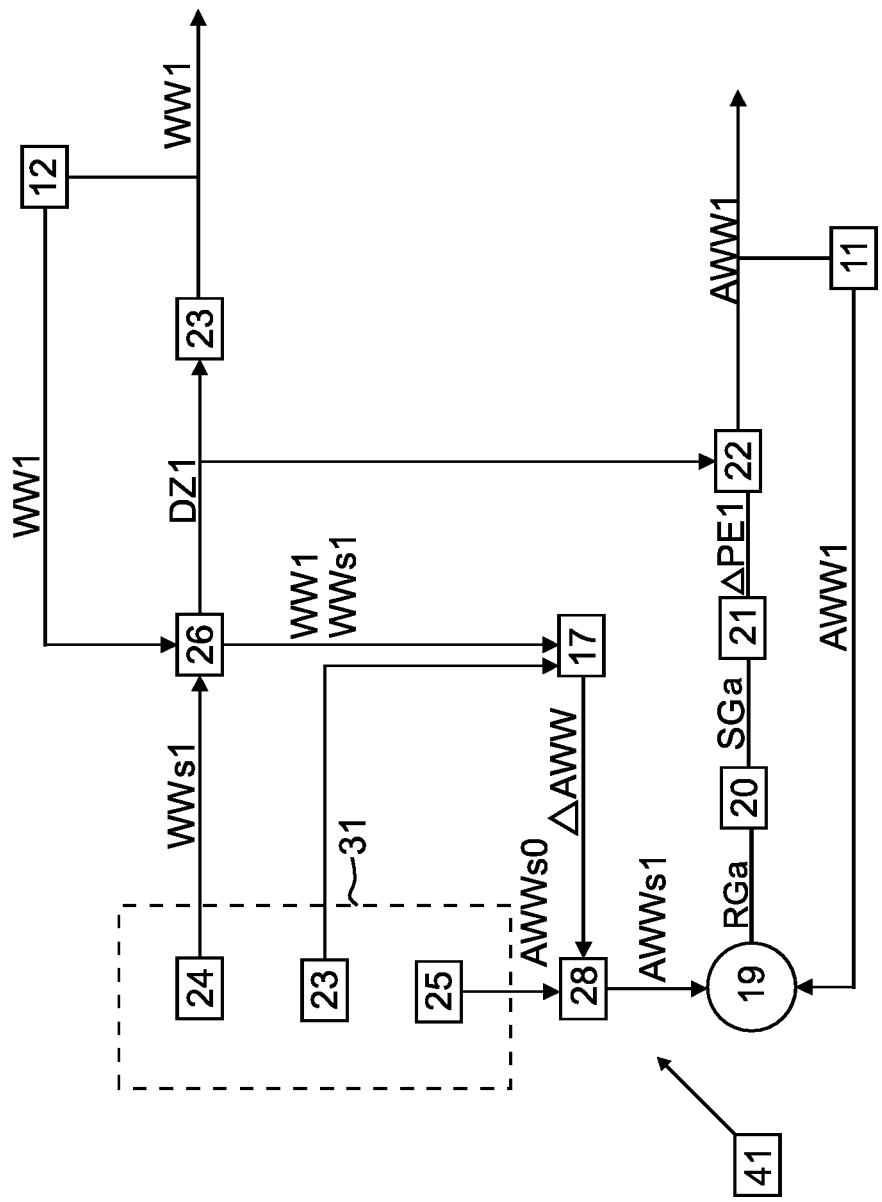
FIG. 4 shows a further preferred embodiment of the method.

Steps 13 to 15 and 23 to 25, steps 16 and 26 and steps 15 and 28 can in principle be combined with one another independently of the embodiments described by way of example with reference to FIGS. 3 and 4.

The method described can be carried out, for example, with control unit 3 and operating station 5.

The invention claimed is:

1. A method for regulating a throwing behavior of a centrifugal spreader for fertilizer, comprising:
   determining a target throwing distance for a target working width, where one of a plurality of rotational speed levels is set for a spreading disc to approximate an actual throwing distance to said target throwing distance; and
   determining an adjusted target throwing angle for regulating an actual throwing angle from said actual throwing distance so as to compensate for a deviation from said target working width caused by a difference between said actual throwing distance and said target throwing distance.

2. The method according to claim 1, where a predetermined target throwing angle is adjusted by an angular offset for determining said adjusted target throwing angle.

3. The method according to claim 2, where said target throwing distance is calculated from a predetermined target throwing angle of 18° to 20° and said target working width.

4. The method according to claim 1, where adjacent ones of the plurality of rotational speed levels differ from each other by at least 10% of a maximum rotational speed of said spreading disc.

5. The method according to claim 2, where said target throwing distance and said predetermined target throwing angle for said target working width are determined based on spreading trials with said fertilizer.

6. The method according to claim 1, where said actual throwing distance is measured continuously by radar, and compared to said target throwing distance.

7. The method according to claim 1, where said actual throwing angle is measured continuously by radar, and compared to said target throwing angle.

8. The method according to claim 1, where regulating said actual throwing angle comprises readjusting said actual throwing angle in time intervals of at least 5 s seconds duration during distribution of said fertilizer.

9. The method according to claim 1, where said actual throwing angle is continuously adjusted based on said adjusted target throwing angle, and said plurality of rotational speed levels are changed only if a predetermined threshold criterion is met.

10. The method according to claim 9, where said threshold criterion is met if a throwing distance assigned to an adjacent one of the rotational speed levels is closer to said target throwing distance than said actual throwing distance, or if said actual throwing angle is within an allowable angle range of 18° to 25°.

11. The method according to claim 1, where an angular offset is set based on a dependence of said actual throwing distance, determined in spreading trials for various target throwing angles for said fertilizer, from said one rotational speed level of said spreading disc.

12. The method according to claim 1, where prior to distribution of said fertilizer, a calibration run of 10 to 20 seconds duration is conducted based on said target working width and using said spreading disc or updating regulation of the actual throwing angle.

13. The method according to claim 12, where said calibration run is conducted only if a value 0 has been registered at least once for said one rotational speed level of said spreading disc following a preceding calibration run, and if the spreading disc is in a spreading mode for normal subsequent runs.

* * * * *